United States Patent
Olds et al.

[11] Patent Number: 5,905,443
[45] Date of Patent: May 18, 1999

[54] PAGING SYSTEM EMPLOYING DELIVERY SCHEDULE COMBINING AND METHOD OF OPERATION THEREOF

[75] Inventors: Keith Andrew Olds, Mesa; Patrick O'Connor Smith, Damascus; Ralph Charles Gregg, Tempe, all of Ariz.

[73] Assignee: Motorola, Inc., Schaumburg, Ill.

[21] Appl. No.: 08/925,170

[22] Filed: Sep. 8, 1997

Related U.S. Application Data

[63] Continuation of application No. 08/537,383, Oct. 2, 1995, abandoned.

[51] Int. Cl.$^6$ .............................. H04B 7/00; H04Q 7/00
[52] U.S. Cl. .............................. 340/825.21; 340/825.44; 370/310; 370/312; 370/313; 455/13.2; 455/13.3; 455/13.4
[58] Field of Search ...................... 340/825.44, 825.21; 455/13.4, 13.3, 13.2; 370/310, 312, 313

[56] References Cited

U.S. PATENT DOCUMENTS

| | | | |
|---|---|---|---|
| 4,901,307 | 2/1990 | Gilhousen et al. | 370/18 |
| 5,239,668 | 8/1993 | Davis | 455/12.1 |
| 5,239,671 | 8/1993 | Linquist et al. | 455/13.1 |
| 5,257,019 | 10/1993 | Schwendeman et al. | 340/825.49 |
| 5,394,560 | 2/1995 | Kane | 455/12.1 |
| 5,398,021 | 3/1995 | Moore | 340/827.27 |
| 5,504,476 | 4/1996 | Marrs et al. | 340/825.44 |
| 5,590,395 | 12/1996 | Diekelman | 455/13.1 |
| 5,594,776 | 1/1997 | Dent | 379/58 |
| 5,594,941 | 1/1997 | Dent | 455/13.4 |

*Primary Examiner*—Michael Horabik
*Assistant Examiner*—Yonel Beaulieu
*Attorney, Agent, or Firm*—Kevin K. Johnson

[57] ABSTRACT

A satellite-based, world-wide cellular messaging system (5) transmits paging messages to pagers (2) via multiple beams. A pager (2) monitors multiple beams, recording the schedules for each beam, and by combining the schedules for multiple beams, ultimately determines which frames in the message groups to monitor for messages. Pager (2), which conserves battery resources by entering into a sleep mode, synchronizes quickly to its message block when it awakes.

17 Claims, 9 Drawing Sheets

FIG. 10

| | 1 | 2 | 3 | 4 | 5 | 6 | 7 | 8 | 9 | 10 | 11 | 12 | 13 | 14 | 15 | 48 |
|---|---|---|---|---|---|---|---|---|---|---|---|---|---|---|---|---|
| 114→ | A1 | | | A2 | A3 | A4 | | | | | | | | A5 | | |
| 214→ | | B1 | B2 | | | | | | | | | | | | B3 | |
| 314→ | | | | | | | C1 | C2 | | C3 | C4 | | C5 | | | |
| 514→ | X | X | X | X | X | X | X | X | | X | X | | X | X | X | |

FIG. 11

| | 1 | 2 | 3 | 4 | 5 | 6 | 7 | 8 | 9 | 10 | 11 | 12 | 13 | 14 | 15 | 48 |
|---|---|---|---|---|---|---|---|---|---|---|---|---|---|---|---|---|
| 114→ | A1 | B1 | B2 | A2 | A3 | A4 | C1 | C2 | | C3 | | | | A5 | B3 | |
| 214→ | | B1 | B2 | A2 | | A4 | | C2 | | C3 | | | C5 | A5 | B3 | |
| 314→ | | | | | A3 | A4 | C1 | C2 | | C3 | C4 | | C5 | A5 | B3 | |
| 514→ | | | | | | X | | X | | X | | | | X | X | |

PAGING SYSTEM EMPLOYING DELIVERY SCHEDULE COMBINING AND METHOD OF OPERATION THEREOF

This application is a continuation of prior application Ser. No. 08/537,383 filed Oct. 2, 1995, now abandoned.

RELATED INVENTIONS

The present invention is related to the following inventions which are assigned to the same assignee as the present invention:

(1) Message Unit for Use with Multibeam Satellite-Based Messaging System and Method of Operation Thereof, U.S. Pat. No. 5,596,315 issued Jan. 21, 1997;

(2) Distributed Multi-Outlet Paging, U.S. Pat. No. 5,543,785 issued Aug. 6, 1996.

TECHNICAL FIELD

This invention relates generally to satellite cellular communications systems and, in particular, to a paging system for use with a multi-beam, satellite-based, world-wide cellular messaging system.

BACKGROUND OF THE INVENTION

Simplex data communication systems, also known as one-way or passive systems, are employed in connection with paging. Generally speaking, one or more transmitters broadcast data communications. The communications include data which identify specific pagers. A population of pagers continually receive the broadcast communications. When one of the population of pagers identifies a communication directed to it, it alerts a subscriber to the incoming communication and often displays a numeric or alphanumeric message carried by the communication. Due to the simplex nature of such systems, the system does not know when a pager fails to receive a communication directed to it. On the other hand, these simplex systems have many desirable features. Due to the absence of a transmitter and signal transmission capabilities in the pager, a small, low-power, light-weight, readily portable, and inexpensive unit results.

Conventional paging systems, such as terrestrial based systems, are capable of providing coverage only near commercially viable areas. This concentrated and local coverage restricts reliable delivery of messages outside of these areas.

Satellite communication systems provide a reliable propagation path for non-metropolitan users of paging services. Satellites receive transmitted information and convey it back to pagers on Earth. Transmission of paging information from geosynchronous orbit requires substantial power and a broadbeam transmission which inherently has limited capacity as spectrum is not generally partitioned and reused.

Lower Earth orbiting constellations may partition and reuse communication spectrum as is done with terrestrial cellular duplex communications. Channelized or cellular satellite communication systems may project a plurality of beams upon the Earth. Since propagation boundaries and partitions are not conspicuous, an orbiting satellite may expose a pager to the propagation of multiple cells or beams.

For reliable reception of transmitted messages, a pager would be required to monitor multiple beams from a satellite in order to provide a reasonable assurance that any paged data transmitted to a pager was properly received. Each needless monitoring of an empty paging beam consumes power available to a pager and shortens the life-expectancy of a pager's batteries.

Therefore, there is a substantial need for an improved messaging unit capable of extending the operational life of a pager power source.

There is also a substantial need for encoding and presenting information to a pager for use in evaluating which beams to monitor for an increased probability of paging data.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 10 shows a beam transmission schedule for delivering paging data directed to a particular region serviced by a plurality of beams in the communication system of the present invention.

FIG. 11 shows a beam transmission schedule employing schedule combining for delivering paging data directed to a particular region serviced by a plurality of beams in the communication system of the present invention.

DESCRIPTION OF A PREFERRED EMBODIMENT

Figure 1:
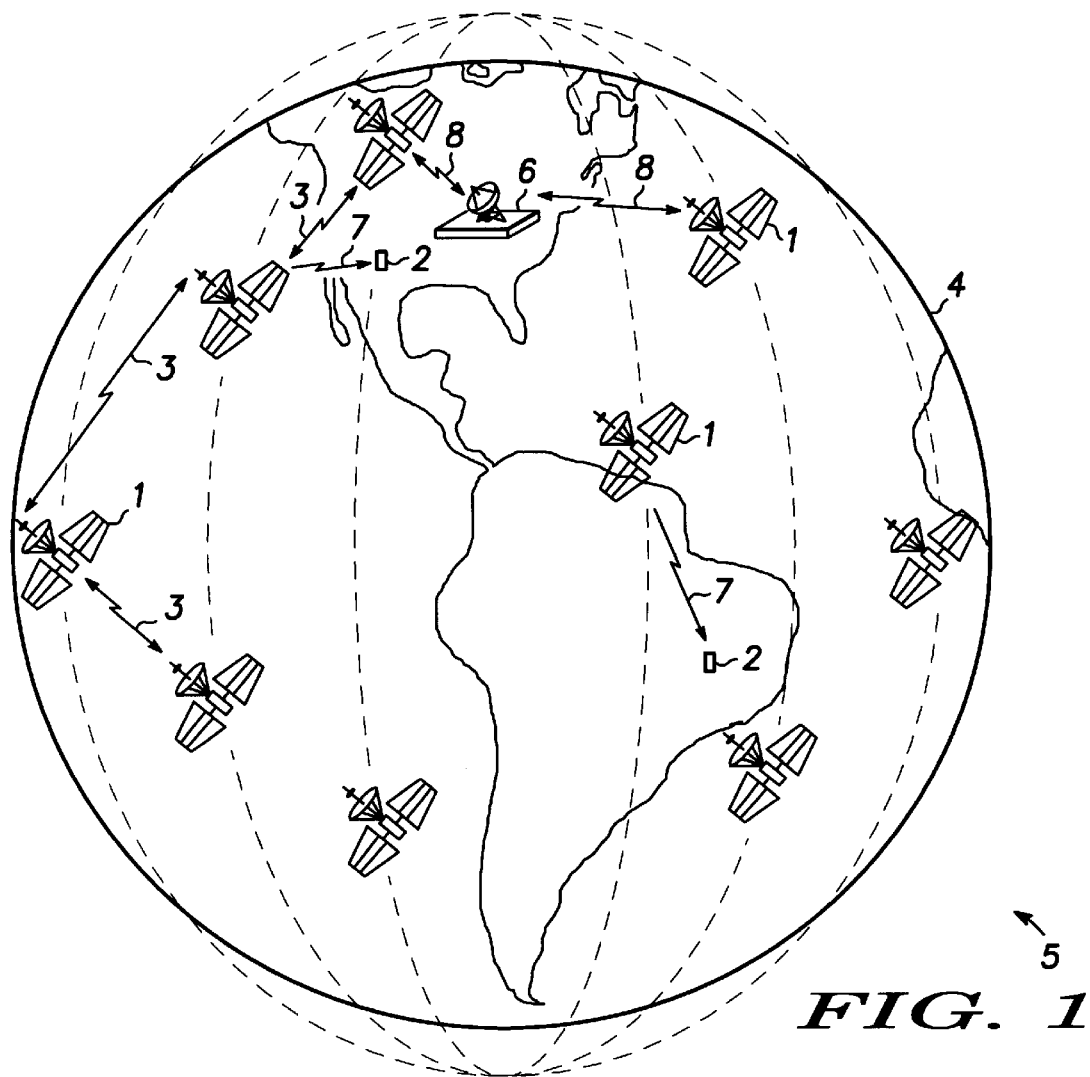
FIG. 1 shows an overview diagram of a satellite cellular communications system in accordance with the present invention.

FIG. 1 shows an overview diagram of a satellite cellular communications system in accordance with the present invention. In accordance with a preferred embodiment, several satellites (also referred to as space vehicles or SV's) 1 are placed in a relatively low orbit around the earth 4. If, for example, satellites 1 are placed in orbits which are around 765 km above earth 4, then an overhead satellite 1 travels at a speed of around 25,000 km/hr with respect to a point on the surface of earth 4. This allows a satellite 1 to be within view of a point on the surface of the earth 4 for a maximum period of around nine minutes. Due to the relatively low orbits of satellites 1, line-of-sight electromagnetic transmissions from any one satellite cover a relatively small area of the earth 4 at any point in time. For example, when satellites 1 occupy orbits at around 765 km above the earth, such transmissions cover areas around 4075 km in diameter. Moreover, nothing prevents satellites 1 from incorporating directional antennas which further divide this area into smaller cells. As illustrated in FIG. 1, satellites 1 are preferably placed in orbits so that the entire constellation of satellites 1 provides continual coverage for the entirety of earth 4.

System 5 additionally includes one or more central switching offices (also referred to as "gateways") 6. Offices 6 reside on the surface of earth 4 and are in data communication with nearby ones of satellites 1 through RF communication links 8. Satellites 1 are also in data communication with one another through data communication links 3. Hence, through the constellation of satellites 1, an office 6 may control communications delivered to any size region of the earth 4. Offices 6 couple to public switched telecommunication networks (not shown), through which requests for the placement of calls to subscribers of system 5 may be received. Each office 6 receives requests to place calls to subscribers believed to be located in a region of the earth 4 associated with that office 6. FIG. 1 shows only one office 6 for convenience. However, those skilled in the art will appreciate that any number of offices 6 may be employed in association with any number of regions of the earth 4. Each of such offices 6 operates substantially as described herein.

System 5 also includes any number, potentially in the millions, of call receivers or pagers 2. Pagers 2 may be configured as conventional pagers or may be included within other portable equipment. Although pagers 2 are referred to hereinafter as pagers 2 for simplicity, those skilled in the art will appreciate that pagers 2 within system 5 need not be included only in units dedicated to traditional paging functions. Pagers 2 are configured to receive communications from overhead satellites 1 and to perform other functions which are discussed below.

Communications from satellites 1 are received at pagers 2 over communication links 7. In a preferred embodiment of the present invention, links 7 utilize RF frequencies which accommodate substantially line-of-sight communication, and links 7 are simplex links. In other words, communications travel only in one direction from satellites 1 to pagers 2. Simplex communication allows pagers 2 to be manufactured as small, inexpensive units and to consume a minimal amount of power. No simplex communication limitation is implied with respect to links 3 or 8.

Figure 2:
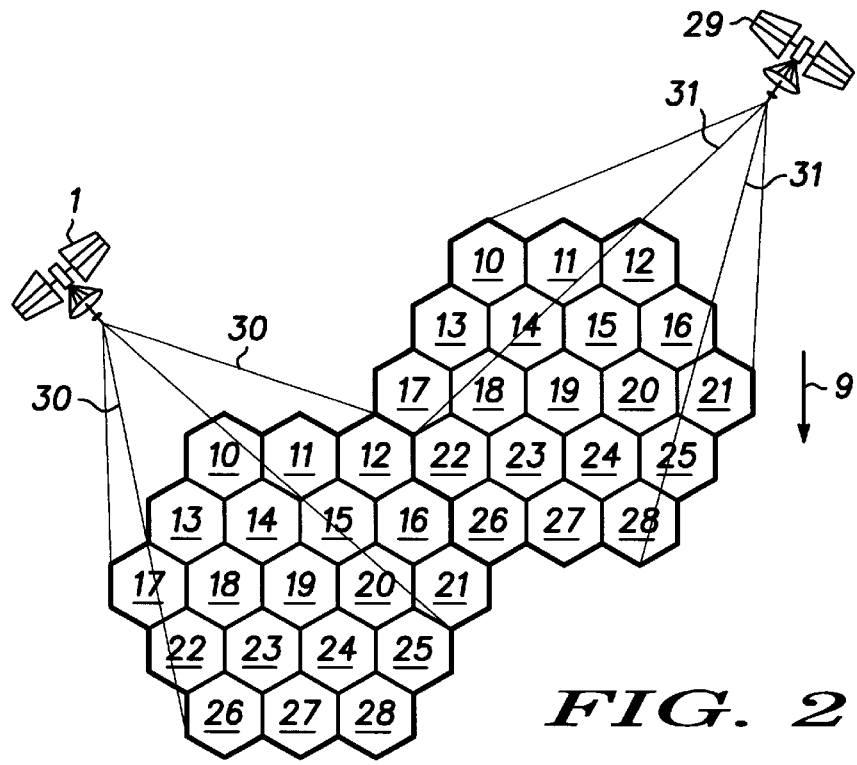
FIG. 2 shows a diagram of cellular patterns formed by adjacent satellites projecting communication beams upon the surface of the earth in accordance with one aspect of the present invention.

FIG. 2 shows a diagram of cellular patterns formed by adjacent satellites projecting communication beams upon the surface of the earth in accordance with one aspect of the present invention.

Satellites 1 and 29 (which may be identical to satellite 1) employ frequency spectrum reuse techniques. These techniques comprise cellular partitioning of projection beam-widths. Satellites 1 and 29 generate beam set projections 30 and 31, respectively. Beam set projections 30 and 31 are bi-directional gain areas (cells or beams) associated with antennas on satellites 1 and 29. These antennas may be individual directional antennas or a phased-array antenna capable of coherent beam projection.

Cells 10–28 may assume many shapes depending on the gain characteristics of the antennas. In FIG. 2, cells 10–28 are shown as hexagons for illustrative purposes. Cells 10–28 advance in orbit direction 9 as satellites 1 and 29 orbit in direction 9.

With satellites 1 and 29 traveling at speeds of up to 25,000 km/hr with respect to the earth, cells 10–28 also travel over the earth at close to this speed. At this speed, any given point on the surface of the earth resides within a single cell for no more than around one minute.

Referring again to FIG. 1, satellites 1 communicate with pager units 2 over links 7 using numerous frequency channels. Thus, satellites 1 and pagers 2 desirably employ a frequency division multiple access (FDMA) scheme so that numerous independent communication links may be established simultaneously. The entire spectrum of these numerous frequency channels is available within each cell. For example, a seven-cell frequency reuse pattern, depicted in FIG. 2, is implemented using time division multiple access (TDMA) techniques to prevent interference between adjacent cells.

In other words, while the entire spectrum is available in each cell, adjacent cells are assigned different time slots within which that spectrum may be used. In a preferred embodiment, frames are defined to include at least seven different time slots to correspond to the seven-cell reuse pattern. Cells labeled "10" in FIG. 2 are assigned one time slot, cells labeled "11" are assigned another time slot, and so on. That way, cells which utilize the same spectrum at the same time are geographically spaced apart from one another.

While FIG. 2 illustrates a seven-cell, seven time slot arrangement, those skilled in the art will understand that a larger or smaller reuse pattern can also be used. Those skilled in the art will appreciate that such a TDMA communication scheme is established at satellites 1. Moreover, when satellites 1 move at speeds of up to 25,000 km/hr, Doppler shift and time slot synchronization parameters between a pager unit 2 and a satellite 1 constantly change.

In a preferred embodiment of the present invention, satellites 1 are configured as moving repeaters. In other words, satellites 1 do little more than receive data communication messages from one source and pass these messages on to a destination. Nothing requires all of communication links 3, 8, and 7 to be similar in frequency and/or timing protocol parameters.

Thus, satellites 1 may also re-package messages received from one communication link into a format compatible with another link before passing the messages on. In addition, satellites 1 may include components which help resolve Doppler and timing shift parameters in connection with the operation of links 3, 8, and 7. Satellites 1 may advantageously communicate such parameters to the entities with which they communicate, such as pagers 2, central switching office 6, and other satellites 1, to help in maintaining synchronization with links 3, 8, and 7.

Figure 3:
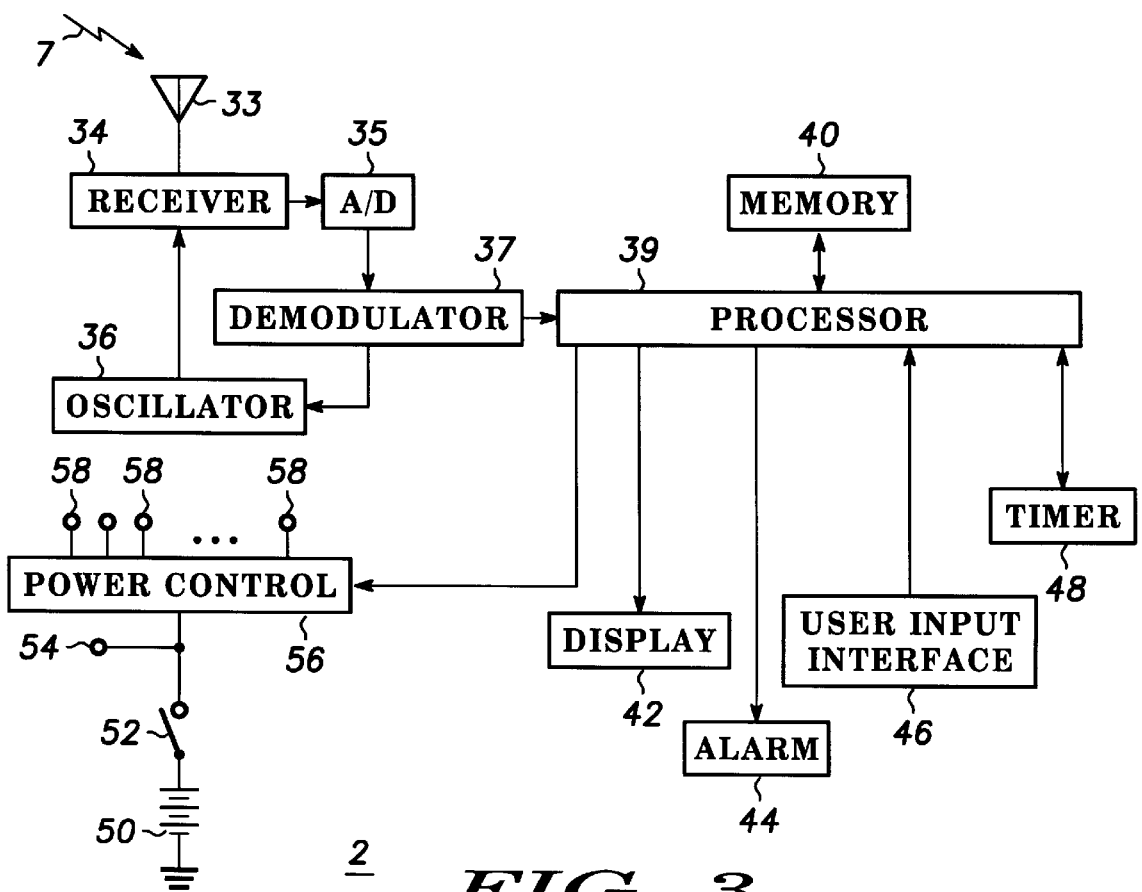
FIG. 3 shows a block diagram of a pager constructed in accordance with one embodiment of the present invention.

FIG. 3 shows a block diagram of a pager 2 constructed in accordance with one embodiment of the present invention. Pager 2 includes an antenna 33 through which communication link 7 is established. Antenna 33 feeds a receiver 34, which includes radio-frequency (RF), mixing, and intermediate-frequency (IF) stages (not shown) as needed to convert RF signals broadcast by satellites 1 to baseband. Receiver 34 couples to an analog-to-digital (A/D) converter 35, which digitizes the baseband signal, and A/D converter 30 couples to a digital demodulator 37 that extracts digital data from the digitized baseband signal.

In preferred embodiments, demodulator 37 recovers bi-phase shift keying (BPSK) encoded data included in the transmission from link 7. Demodulator 37 also supplies a feedback signal to control an oscillator 36. Oscillator 36 provides an oscillation signal that receiver 34 uses in converting the RF signal to baseband.

Demodulator 37 feeds its digital data output to a processor 39. Processor 39 couples to or may include permanently stored data which does not change as a result of operating pager 2. Such permanent data includes computer programs that instruct pager 2 to perform various procedures, which are discussed below. Such permanent data also includes permanent variables which are used in the operation of pager 2, as discussed below. Memory 40 also includes temporary data, which changes as a result of operating pager 2. It is processor 39, under the control of programs stored in memory 40, that controls the operation of pager 2.

Processor 39 couples to various peripheral devices, such as a display 42, an alarm 44, a user input interface 46, and a timer 48. Processor 39 controls display 42 to visibly present data to a user of pager 2. Processor 39 controls alarm 44 to audibly and/or visibly indicate the receipt of a call addressed to pager 2. Processor 39 receives user input, preferably through the operation of keys or buttons (not shown) through interface 46. Processor 39 utilizes timer 48 to synchronize its operations with system timing and, in one embodiment, to keep track of the time of day. Those skilled in the art will appreciate that the function of timer 48 may alternatively be performed within processor 39.

Pager 2 is energized by a battery 50. Battery 50 couples through a power switch 52 to a terminal 54 and to a power control section 56. Power control section 56 switches power to terminals 58 in accordance with commands received from processor 39. Terminal 54 supplies power to at least timer 48. Terminals 58 supply power to the remaining components of pager 2. Pager 2 is de-energized when switch 52 is open, and pager 2 is fully energized and operational when switch 52 is closed and when power is routed to all of terminals 58. Pager 2 may also operate in a energized but low power Sleep Mode. Pager 2 operates in its Sleep Mode when power is not routed to one or more of terminals 58, but switch 52 is closed to route power through terminal 54 to at least timer 48.

Those skilled in the art will appreciate that nothing prevents processor 39 from being de-energized in the Sleep Mode of operation. However, in this situation, timer 48 may advantageously control the application of power to processor 39, rather than processor 39 controlling power to itself as shown in FIG. 3. Moreover, those skilled in the art will appreciate that power may be continuously applied to at least a portion of memory 40 during the Sleep Mode to prevent the destruction of temporary data.

Figure 4:
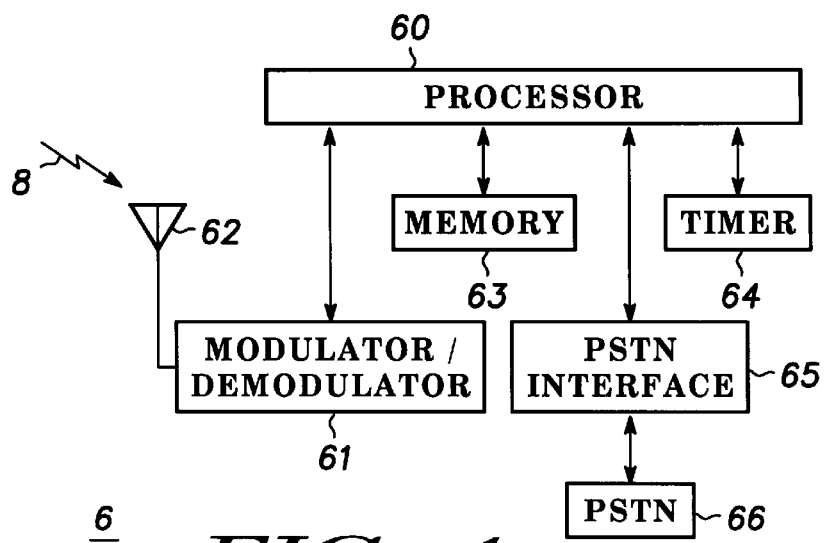
FIG. 4 shows a block diagram of a central switching office or "gateway".

FIG. 4 shows a block diagram of a central switching office or gateway 6. Gateway 6 includes a processor 60, which may be implemented by a single processor or by a network of processors. Processor 60 couples through a modulation/demodulation section 61 to an antenna 62. Antenna 62 is used in establishing communication link 8. Section 61 converts digital data produced (or used) by processor 60 into (or from) modulated RF communications compatible with link 8.

Gateway 6 also includes a memory 63 which stores permanent and temporary data. Such permanent and temporary data include computer programs, data which do not change through operation of gateway 6, and data which change through the operation of gateway 6. A timer 64 also couples to processor 60. Timer 64 allows office 6 to keep a current system time and to act, so that transmissions are sent from gateway 6 in accordance with real-time demands, which are discussed below. Through a public switched telecommunications network (PSTN) interface 65, processor 60 couples to PSTN 66. Requests to place calls to pagers 2 may be received through PSTN 66 and interface 65. In addition, requests to place calls to pagers 2 may be received through the network of satellites 1 (see FIG. 1) and link 8.

Overview of Paging System

The paging system of the present invention is capable of delivering page messages anywhere in the world. At the user's discretion, a single message may be sent to a geographic region varying in size from a small local area to total planetary coverage.

Each pager is assigned an operating interval in the timing and frequency hierarchy. The system paging infrastructure assures that pages are delivered when the destination pager is active.

L-Band Subsystem

The L-Band is the portion of the radio frequency spectrum which is used for the satellite link 7 with a pager and a subscriber unit. The L-Band subsystem provides two basic types of channels. Duplex channels support two-way communications services for use by subscriber units, and simplex channels support one-way messaging services for use by pagers. Duplex services include portable and mobile telephone service, a variety of bearer data services, duplex messaging services, service to mobile exchange units (MXU's) and service to Multi-Line Units (MLU's). Simplex services support the directed messaging service for paging messages.

In addition to the bearer service channels, the L-Band subsystem provides channels that support system overhead functions. These functions include acquisition and access control, subscriber ring alert, subscriber geolocation, and subscriber handoff between antenna spot beams and satellites.

Paging Time and Frequency Control

System access for paging subscribers is limited by the battery life that can be practically obtained in paging units. Pagers are required to operate for a reasonable period of time on inexpensive, easily available batteries if paging is to be commercially viable. This places severe constraints on the activity of the pagers. The present system uses a hierarchical time and frequency strategy to minimize internal pager activity while maintaining adequate paging availability.

The paging communications architecture primarily uses time division multiplexing (TDM) with limited frequency division multiplexing (FDM). These time and frequency resources are organized into an operational hierarchy that determines which time and frequency resources are available at any time.

Each pager is assigned a position in the time and frequency hierarchy when it is built, or when it is reprogrammed. This position determines when the pager is active and what frequency access it monitors. The network paging infrastructure is responsible for tracking the individual pager assignments and insuring that the pages are delivered at the appropriate time on the correct frequency access.

Each 90 ms L-Band frame includes a simplex channel time slot. A satellite transmits paging bursts on up to two frequency accesses during this time slot during normal (baseline) operation. Two additional bursts on two additional frequency accesses can be transmitted if some of the duplex channel capacity is sacrificed. Each different simplex burst is transmitted in a different main mission antenna beam, so the simplex bursts cover different geographical areas. The four frequency access frequencies are selected from the frequency accesses reserved for paging in a simplex channel band that is licensed for global operation. The frequency accesses and beams used at any time are coordinated among all of the system's satellites to avoid interference.

Each paging burst is time division multiplexed into a system control information field and four Paging Data Fields. In a preferred embodiment, each data field can contain either a 20-character numeric (BCD) message or a 10-character alpha-numeric (ASCII) message. A single page alpha-numeric message may occupy up to four Paging Data Fields. It will be apparent to one of ordinary skill that the Paging Data Fields may be of variable length to provide additional flexibility in the paging system.

As will be explained in greater detail below, the frequency accesses used for paging are assigned a permanent priority and activated by the system control segment according to the paging traffic demand. Frequency accesses are activated in priority order, i.e., the primary paging frequency access is always active. If more paging capacity is required, the secondary frequency access is activated. This continues with the tertiary and quaternary frequency accesses.

Paging Timing Hierarchy

Figure 5:
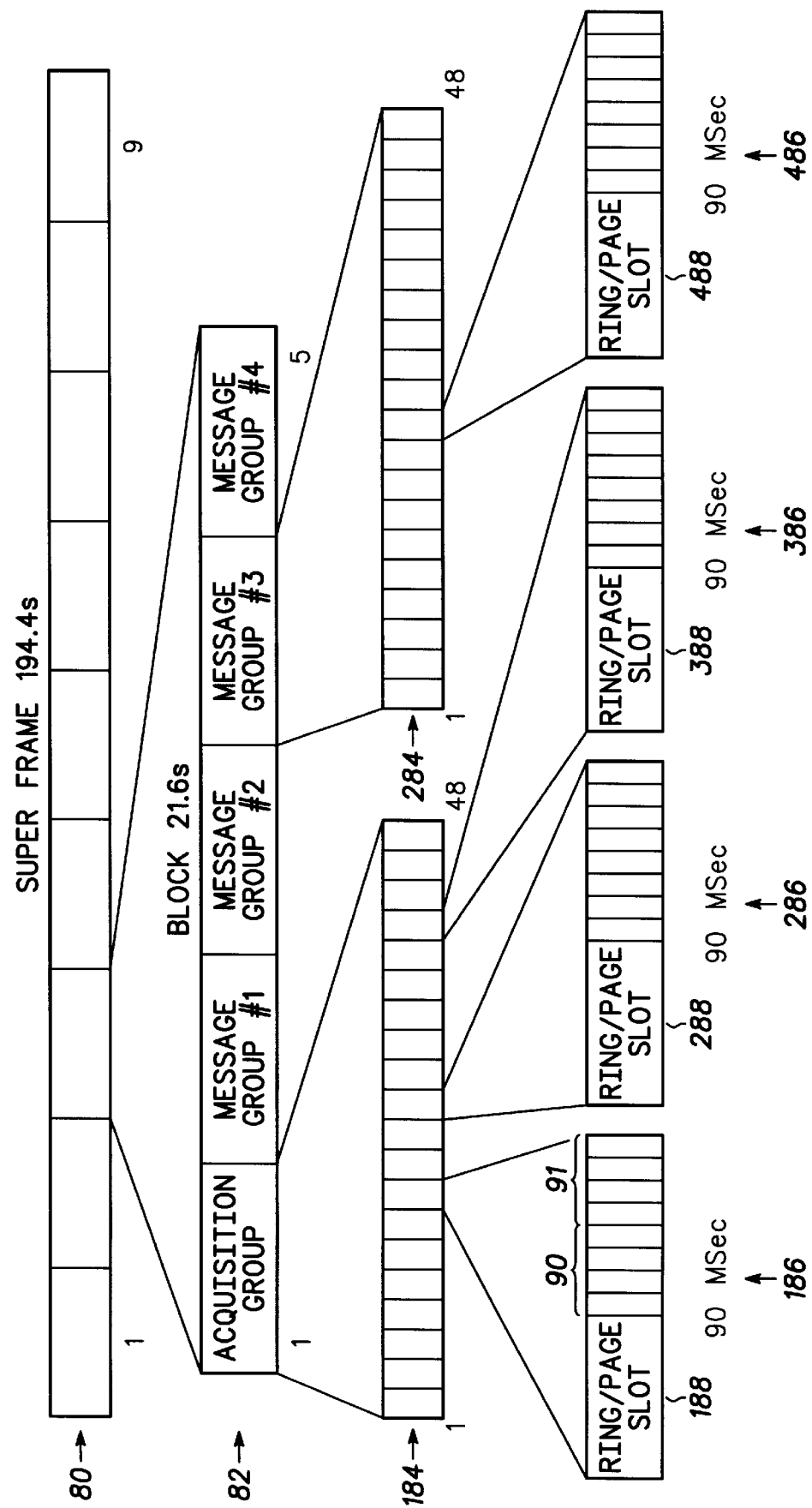
FIG. 5 shows a conceptual diagram of the paging timing hierarchy for the communications system of the present invention.

FIG. 5 shows a conceptual diagram of the paging timing hierarchy for the communications system of the present invention.

Superframe

The paging framing structure uses a four-level timing hierarchy. The highest level of this hierarchy is a 194.4 second (2160 frames) superframe 80. The superframe 80 comprises nine paging blocks 82 of 21.6 seconds (240 frames) each. Each block 82 comprises five groups, two of which are shown as block 184 and block 284 of 4.32 seconds (forty-eight frames). Finally, each of groups 184 and 284 comprise forty-eight 90 ms L-Band frames 186, 286, 386, and 486. The simplex message time slots 188, 288, 388, and 488 occupy 20.48 ms of the 90 ms L-Band frames 186, 286, 386, and 486, respectively. It will be understood by one of ordinary skill that the above-described timing hierarchy is merely exemplary and that many other variations are possible, depending upon the particular system requirement.

Each pager is active during one of blocks 82. Messages may be sent to an active pager during any frame of any group within its active block. The first group of every block 82 is the Acquisition Group 184 for that block. The Acquisition Group 184 includes a special Block Header Message 114 (FIG. 6) that indicates in which frames in the subsequent groups of the block messages will be sent to the area covered by the Acquisition Group 184. Also, Block Header Message 114 also indicates in which frames neighboring messages will be sent by beams neighboring with the area covered by the Acquisition Group 184. This allows pagers to return to Sleep Mode if they are not in an area that will receive paging traffic during their assigned block. The remaining four groups are message groups which do not include the Acquisition Group header 184 and which provide most of the message capacity of the block 82.

Channel Multiplexing

The L-Band communications subsystem is a hybrid time division multiple access/frequency division multiple access (TDMA/FDMA) architecture. Each L-Band channel comprises a time slot and a frequency access.

Duplex channels are provided by common frequency band, time division duplexing (TDD), so each duplex service user is provided with an uplink channel and a downlink channel. Circuit switching is used for duplex channel assignment such that each user has exclusive use of the assigned channels until the user terminates his service or until he is handed off to a different channel.

The TDMA/FDMA architecture provides for frequency and time orthogonality between simplex and duplex channels. The time orthogonality ensures that the space vehicle neither transmits the higher powered simplex signals at the same time as the many duplex traffic channels nor transmits any channel while receiving uplink channels.

The frequency orthogonality minimizes inter-modulation products generated in one satellite's simplex time slot from interfering with another satellite's uplink time slots. This orthogonal time/frequency architecture requires less satellite peak transmit power as well as less stringent inter-modulation, antenna sidelobe, and filtering requirements than a system which does not restrict the transmit and receive time and frequency.

Simplex channels are active during the guard time slot 88 between the duplex channel downlink time slots 91 and the duplex channel uplink time slots 90. In the present embodiment this band provides between two and four paging channels and the ring alert channel.

TDMA Frame

The fundamental unit of the TDMA channel is a time slot. Time slots are organized into 90 ms frames 86. The frame 86 comprises a ringing and paging time slot 88, followed by four uplink time slots 90 and four downlink time slots 91.

A 2400 bps traffic channel uses one uplink and one downlink time slot each frame 86. A 4800 bps traffic channel uses two contiguous uplink and two contiguous downlink time slots each frame 86. The two contiguous uplink time slots must be in the same frequency access, and the two contiguous downlink time slots must be in the same frequency access. Uplink and downlink time slots associated with a particular channel need not be in the same frequency access.

The 90 ms L-Band frame 86 provides 2250 symbols per frame at the channel burst modulation rate of 25 ksps. Except for acquisition channels and the uplink portion of sync channels which use differentially encoded BPSK modulation, the channels all use differentially encoded quadrature phase-shift key (QPSK) modulation with a channel bit rate of 50 kbps.

In the present implementation, the time slots and guard times are defined in terms of the 20 ms channel bit interval, so that the frame clock and bit clocks are coherent with each other.

The four uplink 90 and four downlink 91 time slots form the TDD structure used to provide duplex channels. The ring and paging time slot 88 supports the simplex channels.

The TDMA frame 86 includes guard times to allow hardware set-up and to provide tolerance for the uplink channels.

The separation 88 between downlink and uplink time slots provided by the simplex time slot with its associated guard times avoids satellite-to-satellite interference and phone-to-phone interference. As a result, any frequency used during time slot 88 is not available for use in the duplex traffic channels, and it must be separated far enough from duplex traffic channel frequencies that it can be rejected with practical filters.

Paging Burst Structure

Figure 6:
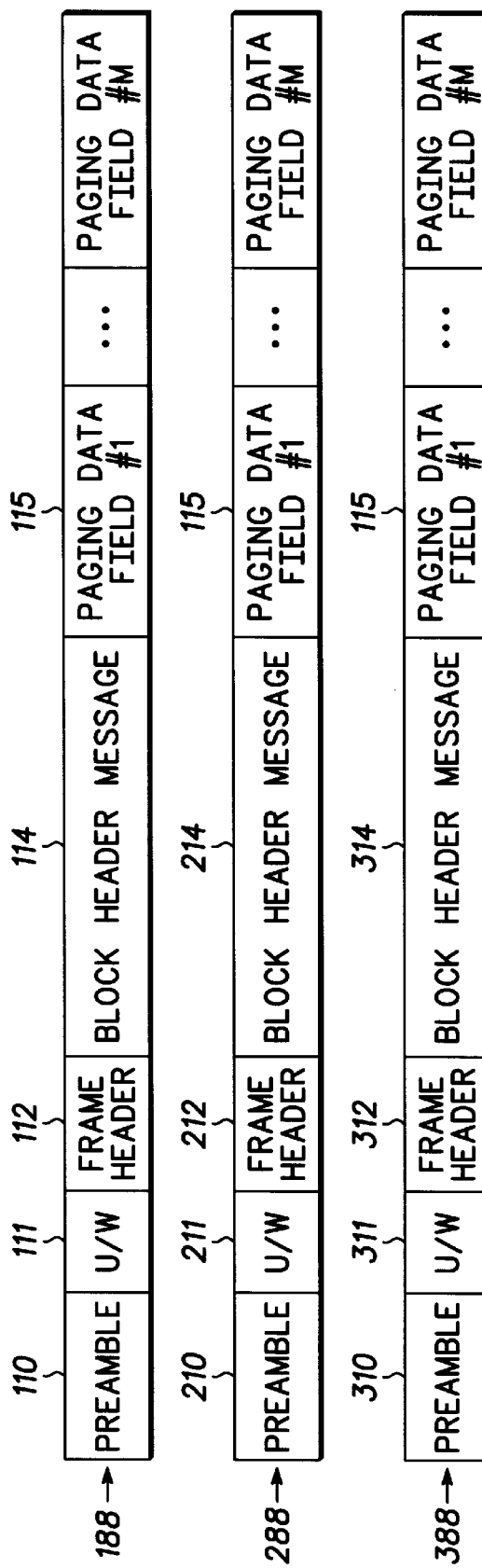
FIG. 6 shows the structure of paging bursts occurring within an Acquisition Group in the communications system of the present invention.

FIG. 6 shows the structure of a paging burst 100 occurring within an Acquisition Group 184 in the communications system of the present invention.

As shown in FIG. 6, paging bursts 188, 288, 388 comprise a Preamble portion 110, 210, and 310, a Unique Word portion 111, 211, and 311, a Frame Header 112, 212, and 312, a Block Header Message 114, 214, and 314, and M Paging Data Fields 115. In a preferred embodiment, M=2.

Figure 7:
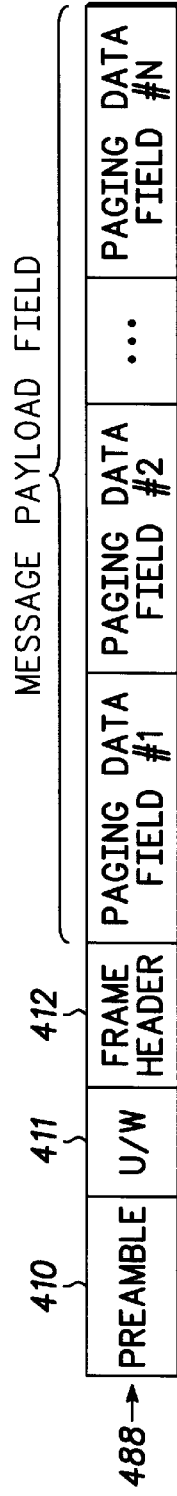
FIG. 7 shows the structure of a paging burst occurring within subsequent groups in the communications system of the present invention.

FIG. 7 shows the structure of a paging burst 488 occurring within a subsequent messaging group 284 in the communications system of the present invention.

A paging burst 488 not occurring within the Acquisition Group 184 but rather within messaging group 284 comprises the same portions as paging burst 188, but it has an expanded Message Payload Field, because it does not have a Block Header Message 114. The Message Payload Field may comprise N Paging Data Fields. In a preferred embodiment, N=4. It will be understood, however, that the Paging Data Fields may be of variable length and thus M and N will also vary.

Except for the Preamble and the Unique Word, the burst fields include forward error correction bits as well as data bits. The paging burst Preamble comprises 2.56 ms of unmodulated frequency access. The Unique Word is "789" Hexadecimal.

Paging Frame Header Contents

The Frame Header Field 112, 212, 312, which is included in each paging burst, comprises a Block ID, a Group ID, a Frame ID, and a Frequency Access ID. The field may include an additional bit allocation for error correction coding.

Block Header Contents

The first forty-eight frame group in each block 82 is an Acquisition Group 184. Each frame within the Acquisition Group may be transmitted on a different one of the active frequency accesses, although it will be understood that just the primary paging frequency access may be used during the Acquisition Group to reduce the system complexity.

Acquisition Group 184 comprises 48 frames, three of which are frames 186, 286, and 386. Each frame corresponds to a beam within beam set projections 30 and 31 (FIG. 2). A satellite 1 may transmit more than one frame into a particular beam as long as such transmissions do not interfere with adjacent beams. Each frame is comprised of a paging burst 188, 288, and 388, respectively. Each paging burst is comprised of a Block Header Message.

Figure 9:
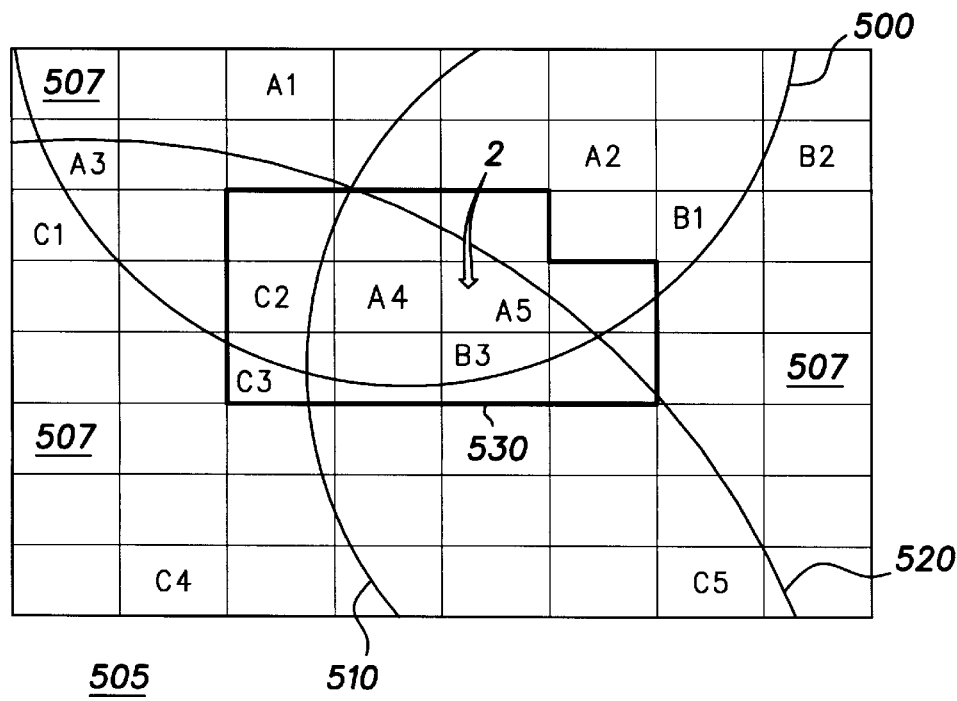
FIG. 9 shows a diagram of overlapping beams projected upon an Earth grid in the communication system of the present invention.

Block Header Message 114 is comprised of a 48 bit schedule wherein an entry in the schedule indexes to a frame in message group 284 that carries paging data for a pager within the service area designated by the frame header. The 48 bit schedule in Block Header Message 114, in the preferred embodiment, also contains the schedule of adjacent beams neighboring a particular paging burst when those neighboring burst overlap the present paging burst. FIGS. 9–11 describe Block Header message contents in more detail.

Paging Delivery Operation

The operation of the system 5 with regard to the delivery of paging messages will now be described.

Channel Scheduling and Channel Use Restrictions

The system 5 controls the channel scheduling for all of the space vehicles 1. There are a number of channel use restrictions that the system considers in performing this scheduling operation.

Paging is accomplished during the simplex channel time slot 188 at the beginning of each 90 ms frame. Selection of the beams and frequencies used in a given frame is also restricted to avoid interference with other paging channels and the ring alert channel. This interference is avoided by spatial isolation. That is, simultaneous paging bursts are transmitted in antenna beams that have adequate pattern isolation to ensure that they do not interfere with one another.

An important consideration in controlling this interference is the differential Doppler between space vehicles. The Doppler shift in outer beams may be as high as ±37.5 kHz, so it is possible for the primary and secondary or tertiary and quaternary frequency accesses to interfere with each other due to Doppler shift. The system is required to plan the paging frequency allocations, so that these signals are isolated when these Doppler shifts occur.

Figure 8:
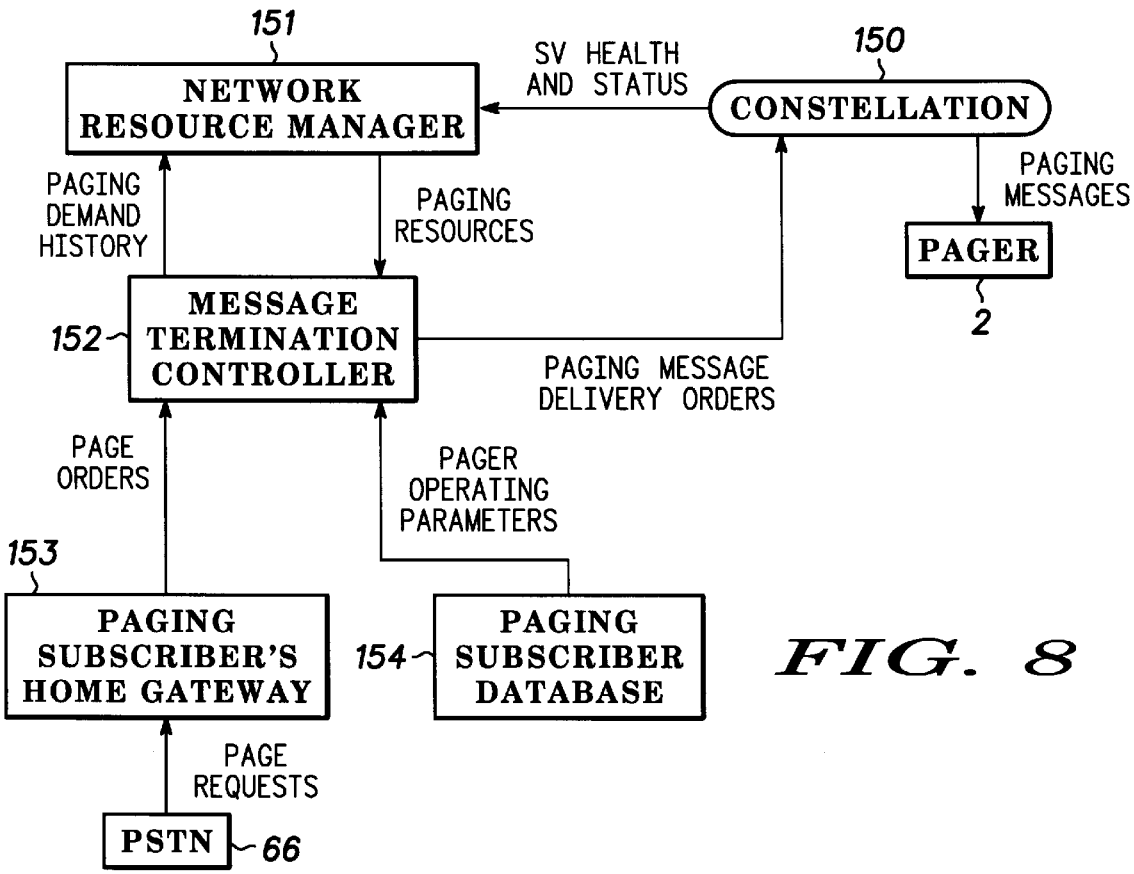
FIG. 8 shows the paging context and information flow of the communications system of the present invention.

FIG. 8 shows the paging context and information flow of the communications system 5 of the present invention. For the purposes of the following discussion, FIG. 8 includes a Constellation 150 of space vehicles, a Network Resource Manager 151, a Message Termination Controller 152, a Paging Subscriber's Home Gateway 153, a Paging Subscriber Database 154, and PSTN (public switched telecommunications network) 66.

Network Resource Manager 151 resides in a dedicated System Control Segment (SCS) (not shown) whose function includes tracking, telemetry, and control of the Constellation's space vehicles. Message Termination Controller (MTC) 152 and Paging Subscriber Database 154 reside in a gateway 6.

To insure that a message is delivered at the proper time, the system 5 maintains Paging Subscriber Database 154, which includes the active block 82 and the frequency access assignment table for each pager. The Message Termination Controller 152 uses that information to organize sequences of paging messages into delivery orders that are sent to each SV. These delivery orders include one frame of paging data along with the Delivery Frame, Delivery Beam, and Frequency Access.

Message delivery schedules consider the available SV resources and other channel restrictions along with pager operation. This information is generated by the Network Resource Manager 151 in the System Control Segment (SCS). The SCS uses paging demand projections, projections of other service demand, information about the operational status and energy state of each SV, and interference planning rules to determine which beams may be paged on which frequency accesses in each frame.

Figure 14:
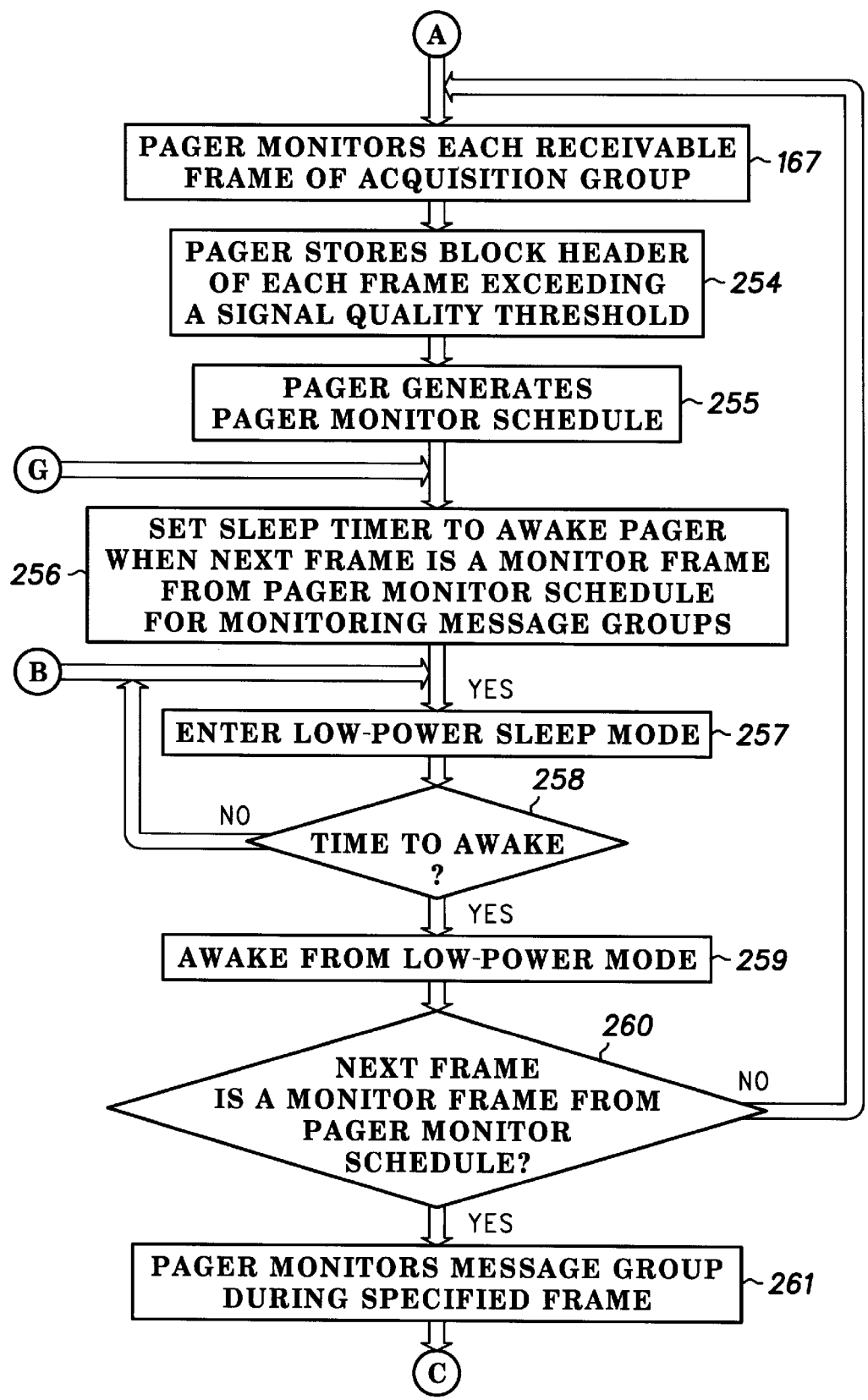

These resource allocations are sent to the MTC as a set of constraints which cannot be violated when the page deliveries are scheduled. The MTC aids in projecting future paging traffic by reporting the paging demand history to the SCS. This message flow is illustrated in FIG. 14.

The SV receives the paging Message Delivery Orders and places them in a paging data buffer according to the scheduled Delivery Frame, Delivery Beam, and Frequency Access. At the scheduled frame, the data is read from the buffer, modulated onto the indicated frequency access and transmitted into the specified Delivery Beam. The MTC ensures that no more than one paging burst is scheduled for each active Frequency Access or Delivery Beam during any frame.

Message Delivery Orders are transmitted so that they arrive during the group 84 before the group in which they are scheduled to be transmitted. Thus, the SV includes large enough buffers to store two groups (10 kilobytes) of paging data along with the scheduling information.

Message Delivery Scheduling

The delivery of paging messages is coordinated with the sleep/wake cycle of the pager 2 for which a message is intended. A pager 2 is active for receiving messages during one 240-frame (21.6 second) block 82 interval during each 194.4 second superframe 80.

Paging messages are transmitted twice to improve the delivery reliability. These deliveries are scheduled to ensure that the pages into a given area are transmitted from space vehicle positions with large angular offsets. This angular diversity increases the probability that the shadowing and blockage of various geometric structures (e.g. buildings, mountains, etc.) are uncorrelated between the two delivery attempts. The angular diversity is preferably accomplished by transmitting from space vehicles in two different orbital planes, but it is occasionally necessary to use positions in the same orbital plane but with large angular offsets.

One of the more complex aspects in the design of a paging system is to determine the delivery processes such that messages are reliably delivered to a pager. This process is complicated by the very limited battery life of a pager which precludes it from operating continuously. The challenge is to define a set of scheduling processes such that a particular pager is "awake" and receiving only during frames in which a message could be directed to it. The message delivery as described above employing superframes, blocks and groups facilitates this objective. A further complication is introduced in an orbital paging system where satellites continuously orbit causing different beams from different satellites to serve different geographical areas at different times. These dynamic conditions mandate decisions be made by a pager as to which particular beams to monitor in expectation of receiving page data.

In the preferred embodiment, each pager is permanently assigned to a block and all paging correspondence with a pager will occur exclusively in that block. Thus, it is only necessary that a pager "awake" and monitor paging channels during that period. This along with the fact that the simplex time slot used for messaging only occupies 20.32 ms of the 90 ms L-Band frame reduces the pager duty cycle to approximately 2.5%. This duty cycle is further reduced by the present invention.

The operation within a block is much more dynamic than at the superframe and block level. The transmission schedule depends on, among other things, satellite position, traffic demand, and traffic destinations. The particular frame (time), satellite, and beam used to transmit a message is selected by MTC 152 to ensure that the transmission does not interfere with other transmissions. Consequently, the deliveries must be scheduled in near real time, and the pagers must adjust their receiving schedules accordingly.

As mentioned above, messaging system 5 assists pagers 2 in selecting a receiving schedule by providing transmission schedules in the Acquisition Group 184.

FIG. 9 shows a diagram of overlapping beams projected upon an Earth grid in the communication system of the present invention. A delivery region 505 is shown divided into a uniform array of logical delivery areas (LDA) 507. An LDA 507 is the smallest geographic area to which a message can be addressed for delivery. Delivery region 505 is served by overlapping beams, beam-A 500, beam-B 510, and beam-C 520 projected by one or more satellites 1. Each LDA 507 has been assigned to one of beams-A 500, beams-B 510, or beams-C 520 which will transmit messages to that LDA for the current paging block. LDAs associated with each beam which are scheduled to contain paging data for a pager in a specific LDA are indicated by a letter followed by an index number. Pager 2 is located in an LDA 507 and the page data destined for receipt by pager 2 is designated A5 and serviced by beam-A 500. Overlapping beam-A 500, beam-B 510, and beam-C 520 form a multi-beam service area 530 wherein LCAs 507 encompassed by multi-beam service are 530 receive substantially the same signal level. Paging services generally employ higher power transmissions allowing a pager to be capable of monitoring a large number of beams, even 10 separate beams is not uncommon in the present invention. For clarity, only 3 overlapping beams have been shown.

FIG. 10 shows a beam transmission schedule for delivering paging data directed to a particular region serviced by a plurality of beams in the communication system of the present invention.

A pager 2 monitors all discernible frames in acquisition group 184. Some of the frames in acquisition group will not be detectable by pager 2 because they are transmitted to beams or cells 10–28 (see FIG. 2) that are sufficiently distanced from pager 2. FIG. 10 depicts the contents of block headers 114, 214, and 314 as received in frames 186, 286, and 386 corresponding to beam-A 500, beam-B 510, and beam-C 520, respectively.

MTC 152 (FIG. 8) generates the paging schedules as transmitted in block header 114, 214, and 314. Block header 114 shows that MTC 152 has scheduled paging transmissions in frame denoted by 1, 4, 5, 6, and 14 corresponding to transmissions that will occur in beam-A 500. As was noted in FIG. 9, beam-A 500 covers many LDAs 507 and thus many not containing the specific pager 2 will also receive the transmission directed to pager 2. Pager 2 also receives block header 214 corresponding to frame 286 as transmitted in beam-B 510. Block header 214 displays a schedule corresponding to transmissions in frames 2, 3, and 15 in message groups, one of which is message group 284. Pager 2 in monitoring acquisition group 184, also detected frame 386 projected in beam-C 520 with frame 386 having block header 314. Block header 314 can be seen as having paging messages scheduled to be transmitted throughout beam-C 520 during frames 7, 8, 10, 11, and 13 and directed to pagers located in LDAs 507 denoted by C1–C5.

Since the paging operation is a simplex process, pager 2 is unaware of which of frames 186, 286, or 386 actually carry the proper schedule directing pager 2 to a proper frame in a messaging group that may contain a specific message addressed to pager 2. This uncertainty mandates that pager 2 monitor all of the potential frames as directed by a combination of all of the schedules. A pager monitor schedule 514 illustrates that of the 15 frames depicted, a pager would be required to monitor 13 frames to be certain that any messages directed to pager 2 could be discerned. Now referring back to FIG. 9, requiring pager 2 to monitor message group frames containing messages destined for LDAs 507 distanced from pager 2 such as LDAs 507 denoted by messages A1, B2, and C4, needlessly wastes pager power and shortens the effective operational time of pager 2.

FIG. 11 shows a beam transmission schedule employing schedule combining for delivering paging data directed to a particular region serviced by a plurality of beams in the communication system of the present invention.

FIG. 11 illustrates the same beam schedules for the same set of message delivery transmissions as FIG. 10 shown in bold letters A1–A5, B1–B3, and C1–C5. Also shown in FIG. 11 is the augmentation of each of block headers 114, 214, and 314 using a beam schedule combining method.

Specifically, block header 114 comprises the original messages A1–A5 corresponding to specific LDAs 507 wherein pagers reside. Additionally, block header 114 also carries a portion of other beam's schedules that beam-A 500 would have been capable of delivering if selected by MTC 152. Referring back to FIG. 9, beam-A 500 projects about LDAs 507 denoted by messages A1, A2, A3, A4, and A5 and beam-A will be the delivering beam for the transmission of those paging messages. However, beam-A 500 would have also been a candidate beam for delivering messages denoted as B1, B2, B3, C1, C2, and C3 if selected by MTC 152.

Likewise, beam-B 510 projects about LDAs 507 denoted by messages B1, B2, and B3 and beam-B will be the delivering beam for the transmission of those paging messages. However, beam-B 510 would have also been a candidate beam for delivering messages denoted as A2, A4, A5, C2, C3, and C5 if selected by MTC 152.

Furthermore, beam-C 520 projects about LDAs 507 denoted by messages C1, C2, C3, C4, and C5 and beam-C will be the delivering beam for the transmission of those paging messages. However, beam-C 520 would have also been a candidate beam for delivering messages denoted as A3, A4, A5, and B3 if selected by MTC 152.

A multi-beam service area 530 defines the region that receives substantial energy from all three of the beams. MTC 152 could have used any of those beams to send message into the LDAs 507 encompassed in area 530. Thus, the transmission into area 530 are included in the schedules of all three beams.

Now referring back to FIG. 11, it should be noted that pager 2 upon receiving a plurality of block headers 114, 214, and 314 cannot distinguish between schedule entries that will actually be carried by a specific beam and those that are merely combined and entered from adjacent or neighboring beams.

Pager 2 upon receiving block headers 114, 214, and 314, evaluates the information common to all beams and determines that if a message were to be routed to pager 2, then using schedule combining, any message routed to pager 2 would be reported as being able to have been delivered by each of beams 500, 510, and 520. Therefore, pager 2 conserves power by only activating and receiving during common frames 6, 8, 10, and 14 as denoted by the common entries in each of block headers 114, 214, and 314.

In FIG. 11, a pager monitor schedule 614 illustrates that of the 15 frames depicted, a pager receiving a schedule from a MTC 152 that employed schedule combining, would only be required to monitor 5 frames to be certain that any messages directed to pager 2 could be discerned. This is a considerable improvement over the method of FIG. 10 that required pager 2 to monitor 13 frames in order to be reasonably certain of receiving a page directed to pager 2.

Figure 12:
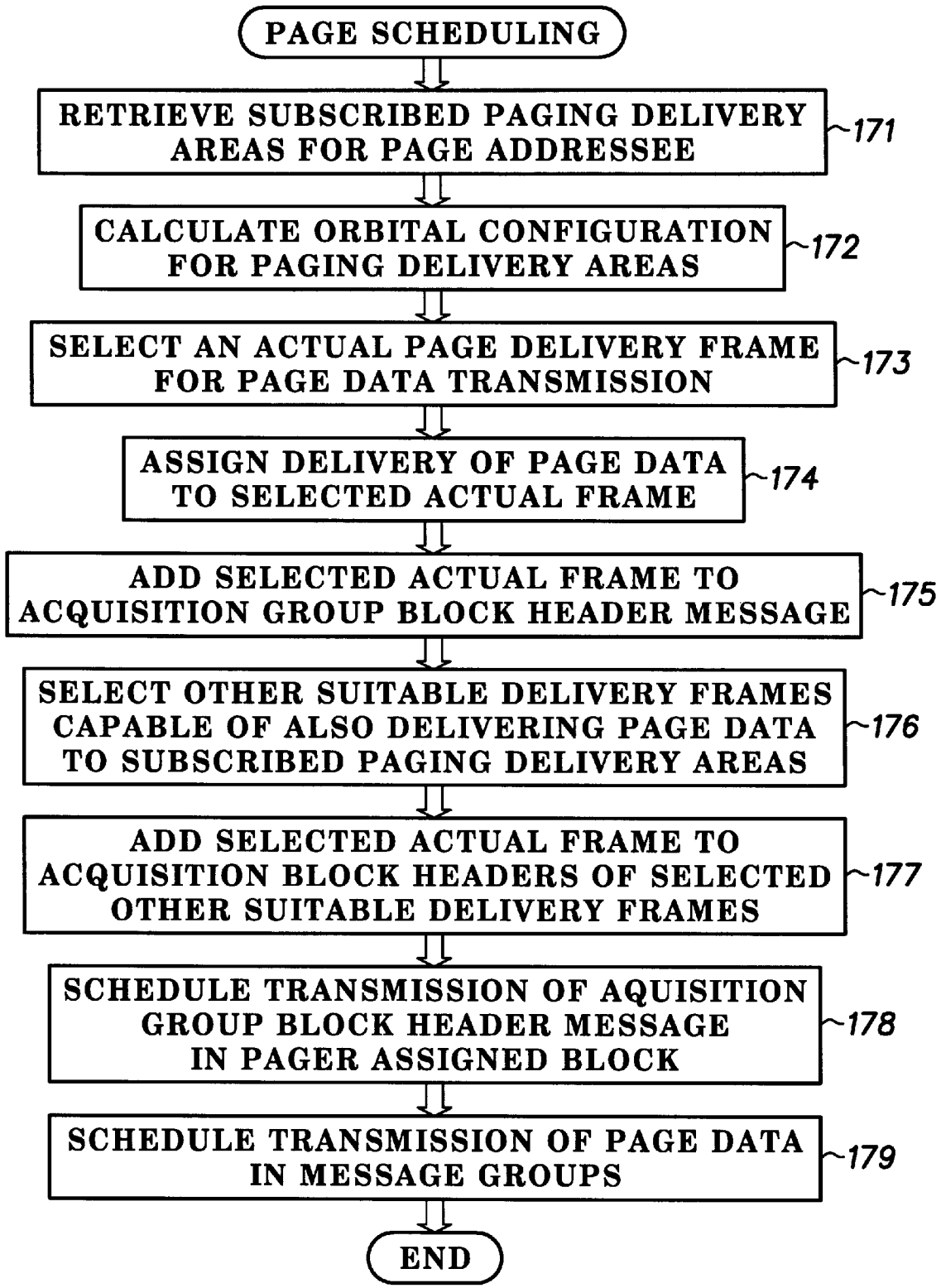
FIG. 12 shows a flow diagram of a method of operating a paging scheduler, in accordance with the present invention.

FIG. 12 shows a flow diagram of a method of operating a paging scheduler, in accordance with the present invention.

This method is performed by MTC 152 in determining the information to place in the schedules of block headers 114, 214, and 314. When a paging message is requested by a page initiating party, MTC 152 begins performing the page scheduling procedure.

A task 171 consults a database containing entries for each pager 2 registered to the system. Each user of a pager 2 informs MTC 152 of the locations wherein it will operate or be visiting and MTC 152 equates a user location to a specific LDA 507. Billing is generally associated with the quantity of LDA associated with a users operation region.

A task 172 calculates the orbital configuration of the system to determine which satellites 1 and which beams will immediately be servicing the pager area as selected by the pager user.

A task 173 selects one from among several possible beams through which to deliver the paging message. MTC 152 may choose from among several methods for determining through which beam to transmit a page message. One method would be to select the most direct cell thus maximizing signal quality, or MTC 152 may choose to group pages to neighboring LDAs in a single transmission beam and minimize the number of beams a pager must monitor.

A task 174 assigns the paging message to a particular frame within the messaging groups of an assigned block. Each frame of acquisition message groups does not necessarily correspond one to one with a beam. Noninterfering beams may be activated concurrently with other beams during the same frame. This concurrent activation accommodates increased bandwidth demands. In the preferred embodiment, there are 48 frames from which to choose and the paging system masterplans activation throughout the entire satellite constellation to minimize inference from adjacent satellites.

A task 175 adds the selected frame assignment to the acquisition group corresponding to the block assigned to pager 2. This addition may be an ORing function with any previously logged frame assignments associated with the acquisition group.

A task 176 evaluates other beams sufficiently qualified to have been selected to deliver the paging data to pager 2. This evaluation may be performed using beam propagation models to determine an effective receive signal quality associated with these other beams in relation to LDAs subscribed to by pager 2.

A task 177 adds or ORs these selected phantom entries into frames associated with beams also capable of delivering paging data. By multiply including capable but non-delivering entries into a frame associated with a beam, a pager may deduce from evaluating the schedules of favorably transmitting beams that a number of those beams could have successfully delivered the data and that monitoring a frame in a message group or groups that is pointed to by a plurality of entries in several beams, is likely to contain message data for a pager if data has in fact been dispatched to pager 2.

A task 178 combines and schedules the transmission of the assembled block headers containing the combined schedules of all frames into an acquisition group.

A task 179 schedules the transmission of pager data in the corresponding message group pointed to by the actual frame selected in task 173. Page data may be transmitted in a single message group or, as in the preferred embodiment, repeated in each of message groups 1–4. MTC 152 now dispatches the assembled block 82 (FIG. 5) throughout the constellation of satellites 1.

Figure 13:
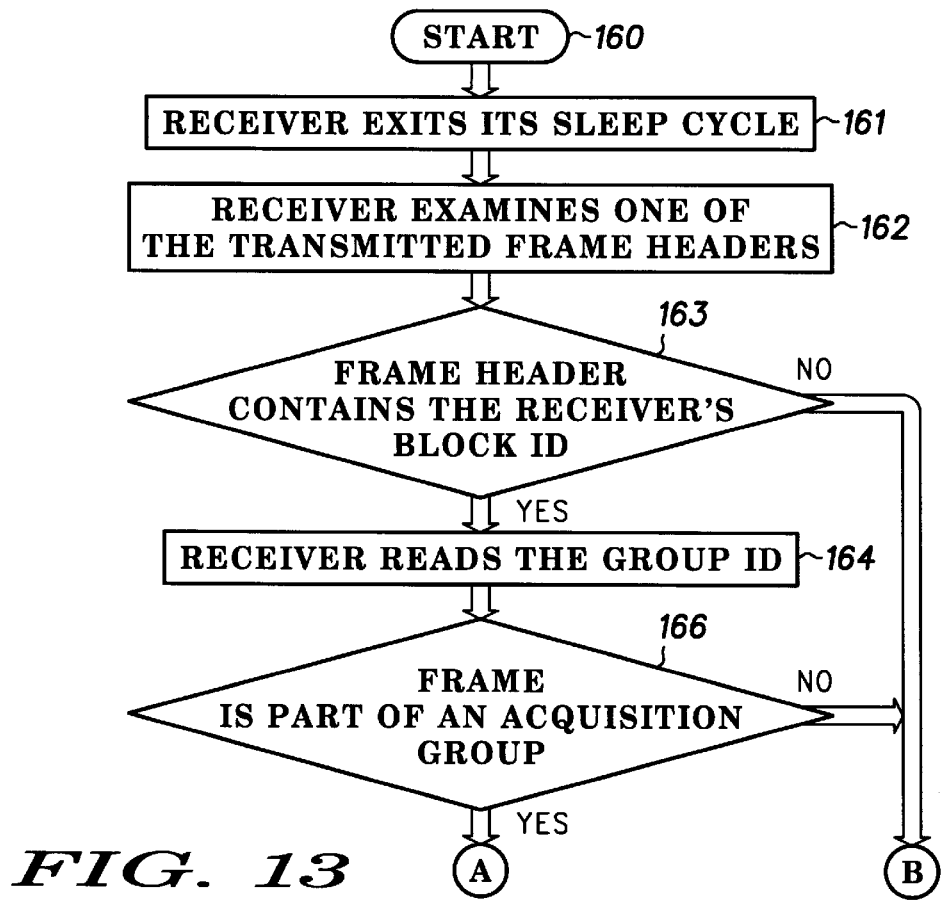
FIGS. 13–15 show a flow diagram of a method of operating a pager, in accordance with the present invention.
Figure 15:
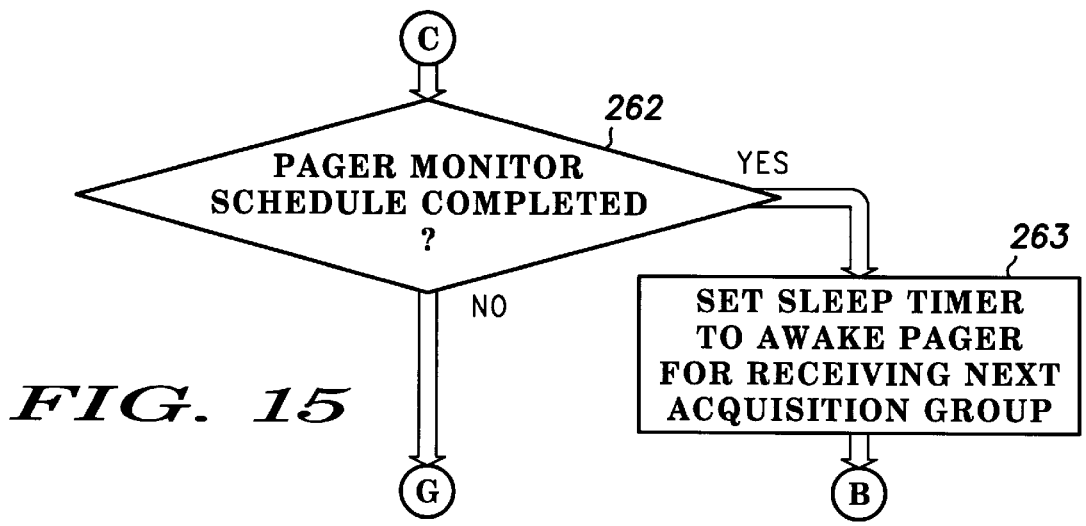

FIGS. 13–15 show a flow diagram of a method of operating a pager, in accordance with the present invention.

The process begins in block 160.

Next, referring to task 161, a pager exits its sleep cycle or Sleep Mode.

Next, in task 162, the pager examines one of the transmitted Frame Headers.

Next, in query task 163, a check is made whether the Frame Header contains this pager's Block ID. If so, the method proceeds to task 164, where the pager reads the Group ID, but, if not, the method proceeds to task 257 via line 165. In task 257, the pager uses the Frame Header ID from this frame to determine when it should awake from its sleep cycle, and then it proceeds to query task 258, where the pager remains in its sleep cycle until the awake time arrives.

From task 164, the method proceeds to query task 166, where a check is made whether the frame is part of an Acquisition Group. If so, the method proceeds to task 167, but, if not, it proceeds via line 165 to task 257.

In task 167, the pager monitors each receivable frame of the acquisition group. These monitored frames must meet a receive signal threshold to guarantee reliability of received data.

In task 254, the pager stores block header data of each frame exceeding a signal quality threshold. Next, the pager generates a pager monitor schedule in a task 255 from the received frames in the acquisition group. This monitor schedule is generated by analyzing the received block headers and from an analysis of them, selecting frame corresponding to the messaging groups to monitor for possible message data.

In a task 256, a pager evaluates the pager monitor schedule and sets a sleep timer to awake pager when the next frame is a monitor frame from the pager monitor schedule. This enables the pager to awake and monitor the message groups of a possible message.

In a task 257, the pager enters the low-power sleep mode for battery conservation.

A query task 258 works in conjunction with the timer to determine if it is time to awake. If query task 258 determines that it is not time to awake, then processing passes back to task 257 for continued low-power sleep operation.

When query task 258 detects that the time to awake has arrived, processing passes to a task 259 and the pager awakes from its low-power sleep mode.

Next, a query task 260 evaluates the reason for awaking. If query task 260 determines that the next frame is a monitor frame from the pager monitor schedule, then processing passes to a task 261 where the pager monitors the message group or groups during the specified frame. When query task 260 determines that the next frame is not a pager monitor frame from the schedule, then processing passes to task 16 to monitor the next acquisition group.

A query task 262 follows task 261 and evaluates the completion of monitoring as dictated by the pager monitor schedule. If the schedule has been completely monitored, then processing passes to task 263 wherein the sleep timer is set to expire just prior to the arrival of the next acquisition group. Processing from task 263 then returns to task 257 for low-power operation. When query task 262 determines that the pager monitor schedule has not completed, then processing returns to task 256 and the sleep timer is reset for the next frame monitoring.

Conclusion

In summary, the present invention provides an improved message unit for use in a satellite-based, world-wide cellular messaging system. The message unit is capable of determining the optimum beam to monitor for its messages. In addition, it can synchronize very quickly to its message block. Further, it comprises a mechanism for achieving significant savings in its battery resource.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method of operating a pager in a satellite paging system having a plurality of satellites each projecting a plurality of overlapping beams, said pager having a sleep cycle and a wake cycle, said pager being subjected to transmitted information in which a plurality of messages are grouped into a frame, a plurality of frames being grouped into a group, and a plurality of groups being grouped into a block, each of said frame having a frame header comprising frame, group, and block identification, predetermined frames each comprising a block header, said predetermined frames constituting an acquisition group, and said pager storing an identification value identifying a block to which said pager is assigned, said method comprising the steps of:

(a) said pager exiting said sleep cycle and examining one of said transmitted frame headers;
   (b) if said frame header contains said identification value, proceeding to step (c), otherwise proceeding to step (d);
   (c) said pager determining from said group identification whether said frame is part of said acquisition group;
      (i) if so, said pager monitors said acquisition group comprised of multiple frames, said pager selects block headers from a portion of said multiple frames dispersed across a number of said plurality of overlapping beams having signal quality above a threshold, said pager compares commonalities of each of said block headers of said portion of said multiple frames, and from said commonalities, said pager generates a pager monitor schedule;
      (ii) if not, said pager proceeds to step (d);
   (d) said pager using said pager monitor schedule to determine when it should awake from said sleep cycle to monitor any one of said plurality of overlapping beams, then proceeding to step (e); and
   (e) said pager entering said sleep cycle.

2. A method as recited in claim 1, wherein said pager stores a unique pager address, wherein one of said frames comprises said unique pager address, and further comprising the step of:

(f) if, step (c)(i) is satisfied, said pager monitors said block for its address according to said pager monitor schedule.

3. A method as recited in claim 2, further comprising the step of:

when said pager detects its address, said pager reading said messages, otherwise, said pager continuing to monitor said block for said address.

4. A method of operating a satellite paging communication system having a plurality of satellites each projecting a plurality of beams, wherein a pager monitors a paging transmission during an awake period and ceases to monitor said paging transmission during a sleep period, said paging transmission potentially comprising page data addressed to said pager, said method comprising the steps of:

said paging communication system receiving a page request, said page request being comprised of said page data;
   evaluating a location of said pager for delivery of said page data;

generating a schedule denoting a first time, a first beam, a second time, and a second beam of transmission of said page data wherein said first beam and said second beam are projected from different ones of said plurality of satellites;

organizing said schedule and said page data into said paging transmission, said page data being placed in said paging transmission according to said first time, said first beam, said second time, and said second beam denoted by said schedule;

dispatching said paging transmission into a portion of said paging communication system servicing said location of said pager;

said pager monitoring said schedule of said paging transmission to determine when said pager reverts to said awake period for monitoring said paging transmission, and when said pager ceases to monitor said paging transmission during said sleep period;

during said awake period, said pager resuming monitoring of said paging transmission and said pager searching said paging transmission for said page data addressed to said pager;

when said pager finds said page data addressed to said pager, announcing said page data; and during said sleep period, said pager ceasing from monitoring said paging transmission.

5. A method as recited in claim 4, further comprising the step of:

prior to said receiving step a user of said pager, specifying a location or locations of operation of said pager in said paging communication system.

6. A method as recited in claim 4, wherein said generating step comprises the steps of:

calculating a configuration of at least one of said plurality of satellites; and selecting a portion of said plurality of satellites nearest to said location of said pager for relaying said paging transmission.

7. A method of operating a pager in a satellite paging system having a plurality of satellites each projecting a plurality of overlapping beams, comprising the steps of:

monitoring all discernible said plurality of overlapping beams projected about said pager, each of said plurality of overlapping beams having an acquisition frame transmitted therein and said acquisition frame being comprised of a schedule associated therewith;

selecting a portion of said plurality of overlapping beams projected about said pager that exceed a signal quality threshold;

comparing said schedule of each of said acquisition frame of said portion for common entries;

generating a pager monitoring schedule from common entries into said schedule of each of said acquisition frame of said portion;

monitoring only message frames pointed to by said pager monitoring schedule; and sleeping when said message frames are not pointed to by said pager monitoring schedule.

8. A method as recited in claim 7, wherein said schedule is comprised of indices for said message frames delivering messages through a current beam wherein said current beam is one of said plurality of overlapping beams and said message frames comprising messages for neighboring beams wherein said messages for said neighboring beams could have been delivered by said current beam.

9. An addressable pager, said pager being subjected to information transmitted in a plurality of beams, in which a plurality of messages are grouped into a frame, a plurality of frames being grouped into a group, and a plurality of groups being grouped into a block, each of said plurality of frames having a frame header comprising frame, group, and block identification, predetermined frames each comprising a block header, said predetermined frames constituting an acquisition group, said pager comprising:

a memory for storing an identification value identifying a block to which said pager is assigned;

a battery;

a pager circuit coupled to said battery, said pager circuit having a sleep cycle and a wake cycle;

a timer; and a processor coupled to said timer and to said pager circuit, said processor causing said pager to enter said wake cycle and to examine one of said transmitted frame headers, and if said frame header contains said value said processor causing said pager to determine from said group identification whether said frame is part of an acquisition group, and if so, said pager monitoring said acquisition group, but if said frame header does not contain said value or said frame is not part of an acquisition group, said pager using a pager monitoring schedule, said pager monitoring schedule being determined from monitoring a plurality of said frames from said acquisition group, wherein each one of said plurality of said frames is in different ones of said plurality of beams, and determining common entries from said plurality of said frames to determine when it should awake from said sleep cycle, and then entering said sleep cycle.

10. The pager recited in claim 9, wherein said memory also stores a unique pager address, wherein one of said frames comprises said unique pager address, and wherein, if said frame is part of an acquisition group, said pager monitors said block for its address.

11. The pager recited in claim 9, wherein said one frame further comprises a message, and wherein if said pager detects its address, said pager reads said message, otherwise said pager continues to monitor said block for its address.

12. The pager recited in claim 4, and wherein, using said pager monitoring schedule, said pager wakes up, during the remaining groups of its block, to monitor only said frames to which said pager monitoring schedule points.

13. A pager comprising:

means for monitoring a plurality of overlapping beams for paging schedule information;

means for combining said paging schedule information received from said plurality of overlapping beams to produce a paging schedule; and means, responsive to said paging schedule, for monitoring at least one of said plurality of overlapping beams for a paging message.

14. A method of operating a pager comprising the steps of:

monitoring a plurality of overlapping beams for paging schedule information;

combining said paging schedule information received from said plurality of overlapping beams to produce a paging schedule; and responsive to said paging schedule, monitoring at least one of said plurality of overlapping beams for a paging message.

15. A method of operating a paging scheduler for generating page data delivery orders comprising the steps of:

determining a set of overlapping beams capable of communicating with a pager in a logical delivery area;

selecting a delivery beam from said set of overlapping beams;

scheduling delivery of a paging message by said delivery beam, said paging message having a transmission schedule associated therewith;

scheduling delivery of said transmission schedule by said delivery beam; and scheduling delivery of said transmission schedule by at least one of said set of overlapping beams other than said delivery beam.

16. A method as recited in claim 15 wherein said set of overlapping beams are projected from a plurality of satellites.

17. A method as recited in claim 16 wherein said plurality of satellites reside in multiple orbital planes.

* * * * *

UNITED STATES PATENT AND TRADEMARK OFFICE
CERTIFICATE OF CORRECTION

PATENT NO. : 5,905,443
DATED : May 18, 1999
INVENTOR(S) : Keith Andrew Olds et al.

It is certified that error appears in the above-identified patent and that said Letters Patent is hereby corrected as shown below:

<u>Column 18,</u>
Line 39, delete "9" and replace with -- 10 --.
Line 43, delete "4" and replace with -- 11 --.

Signed and Sealed this

Twenty-first Day of August, 2001

*Attest:*

Nicholas P. Godici

NICHOLAS P. GODICI
*Attesting Officer*  *Acting Director of the United States Patent and Trademark Office*